United States Patent
DeLuca et al.

(10) Patent No.: US 9,677,726 B1
(45) Date of Patent: Jun. 13, 2017

(54) BOTTLE LIGHT AND SHADE

(71) Applicant: AXIS SOURCING GROUP, INC., Concord, CA (US)

(72) Inventors: Domenico F. DeLuca, Concord, CA (US); Mark Knoll, Concord, CA (US)

(*) Notice: Subject to any disclaimer, the term of this patent is extended or adjusted under 35 U.S.C. 154(b) by 398 days.

(21) Appl. No.: 14/552,824

(22) Filed: Nov. 25, 2014

Related U.S. Application Data

(60) Provisional application No. 62/025,118, filed on Jul. 16, 2014.

(51) Int. Cl.
| | | |
|---|---|---|
| F21V 33/00 | (2006.01) | |
| F21S 6/00 | (2006.01) | |
| F21V 1/00 | (2006.01) | |
| F21V 23/04 | (2006.01) | |
| F21S 9/02 | (2006.01) | |

(52) U.S. Cl.
CPC .............. *F21S 6/002* (2013.01); *F21S 9/02* (2013.01); *F21V 1/00* (2013.01); *F21V 23/04* (2013.01)

(58) Field of Classification Search
CPC ........ A47G 2019/2238; F21V 33/0036; F21V 9/12; F21V 33/0024
USPC ........................................... 362/101
See application file for complete search history.

(56) References Cited

U.S. PATENT DOCUMENTS

| | | | |
|---|---|---|---|
| 4,325,109 A | 4/1982 | Mwanyoha | |
| 6,857,755 B1* | 2/2005 | Lewis ................ | A44C 15/0015 362/104 |
| 6,960,320 B1* | 11/2005 | Smith ........................ | F23D 3/24 362/171 |
| 7,465,058 B1 | 12/2008 | Lopez | |
| 2004/0223332 A1* | 11/2004 | Yang .................. | B65D 39/0094 362/362 |
| 2005/0007773 A1* | 1/2005 | Austin .................... | G09F 13/04 362/206 |
| 2009/0122524 A1* | 5/2009 | Yang .................... | B65D 51/245 362/101 |
| 2009/0175029 A1* | 7/2009 | Chiang ................ | B65D 51/248 362/101 |
| 2009/0261368 A1 | 10/2009 | Wang et al. | |
| 2010/0208457 A1* | 8/2010 | Keal ....................... | F21S 8/086 362/234 |
| 2010/0309670 A1 | 12/2010 | Brown | |
| 2013/0335949 A1* | 12/2013 | Kao .......................... | F21L 2/00 362/101 |
| 2014/0204565 A1* | 7/2014 | Zwierstra ............... | A45C 15/06 362/101 |

* cited by examiner

*Primary Examiner* — William Carter
(74) *Attorney, Agent, or Firm* — Charles L. Thoeming

(57) ABSTRACT

An integral light and shade is provided that includes a switched power supply and a plurality of light bulbs configured to provide light directed downward from the shade once the integral light and shade is position upon, and receives into a switch assembly aperture, a rigid member top surface. A switch assembly housed in the shade includes an activating flange orthogonally disposed to the shade central longitudinal axis, and provides electrical power to the light bulbs evenly spaced about a shade longitudinal axis to direct light downward from the shade interior surface. Alternative embodiments include a manual on/off power switch and/or supplemental shade overlays and/or light bulbs that are light emitting diode lamps, and the light and shade switch assembly aperture is sized to receive the top surface of a bottle neck.

17 Claims, 14 Drawing Sheets

BOTTLE LIGHT AND SHADE

CROSS-REFERENCES TO RELATED APPLICATIONS

This United States non-provisional patent application is based upon and claims the filing date of U.S. provisional patent application Ser. No. 62/025,118 filed Jul. 16, 2014.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to an integral light and shade assembly readily applicable to a bottle or similar receptacle having a neck to provide a lamp that includes the integral light and shade assembly mounted around the outside of the bottle neck. An embodiment of the bottle light and shade provides a switch mechanism that is activated by the weight of the light and shade assembly contacting the top of the bottle neck, light bulbs, and a switched power supply.

BACKGROUND OF THE INVENTION

Various methods are used for manufacture of conventional table lamps. The bottle light and shade relates to an integral light and shade assembly which is attachable to the body of a standard bottle neck to form a table lamp.

U.S. Pat. No. 4,325,109 to Mwanyoha (hereinafter "Mwanyoha") discloses and claims a lamp conversion kit wherein a liquor or wine bottle is fitted with a conventional threaded pipe that carries a lamp socket at the top and is then threaded into an inverted cup whose inside diameter exceeds the outside diameter of the standard. At the lower end of Mwanyoha's inverted cup are engaging screws which move radially inward and outward with respect to the cup in order to engage the bottom of the lowest shoulder of standard-necks of various sizes and shapes. At the lower end of Mwanyoha's pipe is affixed a self-locking press-plate which is larger horizontally than the outside diameter of the neck. Mwanyoha's press-plate rests against the top of the bottle neck such that as the pipe is turned to move axially and downward into the cup, the cup and the screws are pulled upward while the plate is pushed in opposite direction downward providing a compressive force between the shoulder and top of the bottle. The axial movement of Mwanyoha's pipe with respect to Mwanyoha's cup provides means for accommodating various heights of the neck on the bottle. Thus, Mwanyoha's lamp conversion kit requires numerous external and internal parts, and only works with empty bottles or bottles that can accommodate the electrical source cord to power an incandescent bulb.

Traditionally, liquor bottles and wine bottles have been an integral part of product advertisement. The color and shape of the bottle, as well as the bottle label and other external characteristics of liquor containers, have become famous and valuable trademarks through the acquisition of secondary meaning. Most liquor dispensing establishments display the liquor bottles prominently as a way to catch the potential customers' attention. It is also common for restaurants serving alcohol and bars to have light emanating promotional devices, such as neon signs conspicuously displaying provided liquors' names, brands, logos or other trademark-type characteristics.

U.S. Pat. No. 7,465,058 to Lopez (hereinafter "Lopez") discloses and claims a bottle storing container and lamp combination providing a housing capable of being opened along its longitudinal axis and shaped so it is capable of storing a bottle upon snap-closing. Lopez's bottle housing in turn includes perforations which allow light generated inside the housing to project in various pre-determined shapes and an outside surface capable of receiving a logo or any other advertisement. Lopez's housing provides a longitudinal hinge system located directly opposite to the section of the housing which opens to receive a bottle, the hinge system being capable of allowing the housing to be opened to receive a bottle and of holding a power cord when the housing is in the closed position. Lopez's bottle container also comprises a top lid and a bottom lid. The top lid comprises a circuit board firmly attached to the inside of the lid and wire connections capable of connecting to a source of power via a power cord through a plug and an on/off switch on the exterior side of the lid, and a top hub firmly attached to the bottom of the top lid forming an enclosure which houses the circuit board and the wires, the top hub being appropriately shaped to hold the top of a bottle firmly in place, the top hub housing multiple LED bulbs connected to the power source through the wire connectors capable of illuminating the inside of the bottle container so that the light reflects against the bottle and projects outwardly through the perforations upon turning the exterior switch on, the top hub further comprising a plug capable of receiving a power cord. Lopez's bottom lid comprises a bottom hub firmly attached to the bottom side of the bottom lid shaped so it can receive a power cord rolled around the bottom hub and at the same time hold the bottom of a bottle firmly in place. Lopez's bottle storing container and lamp combination requires a housing fully enclosing the bottle, and seemingly would not readily function as a table lamp. And the label or logo aspect of Lopez's bottle storing container and lamp combination require that an additional label or logo be affixed to the housing exterior in order to be appreciated.

Accordingly, there is a need for an integral bottle light and shade that can be fitted onto a bottle neck to provide a conventional table lamp.

There is further need for an integral bottle light and shade that can be fitted onto a bottle neck to provide display lighting for the bottle's company name, logo or other trademark-type characteristics.

There is yet a further need for an integral bottle light and shade that can be fitted onto a bottle neck to provide a stand-alone source of power for lighting without the requirement of an external cord or AC/DC plugged power or accompanying power adapters.

There is also a need for an integral bottle light and shade that can be fitted onto a bottle neck to provide display lighting switched on by the placement of the integral bottle light and shade onto the top surface of the bottle neck.

Yet another need is for an integral bottle light and shade that can be fitted onto a bottle neck to provide display lighting that can be easily and inexpensively manufactured, and easily used.

DISCLOSURE OF INVENTION

An embodiment of an integral bottle light and shade is provided that includes a switched power supply and a plurality of light bulbs configured to provide light directed downward from inside the shade interior once the integral bottle light and shade is position upon, and receives into a switch assembly, the bottle neck top surface.

The embodiment of an integral bottle light and shade provides a switch assembly housed in a central aperture of a shade interior planar surface is orthogonally disposed to a shade central longitudinal axis. The shade interior planar surface also includes plurality of light bulbs evenly spaced one from the other about the shade central longitudinal axis and embedded in a shade interior planar surface so that when they are powered the light bulbs shine downward from the shade interior surfaces onto the bottle and the surface area supporting the base of the bottle.

The light bulbs are switched on when the weight of the integral bottle light and shade assembly receiving the bottle neck top surface forces the bottle neck top surface into the switch assembly, closing the power circuit to the light bulbs.

Alternate embodiments of an integral bottle light and shade further include a manual on/off switch and/or shade covers.

Other features, advantages, and objects of the integral bottle light and shade will become apparent with reference to the following description and accompanying drawings.

MODES FOR CARRYING OUT THE INVENTION

Referring now to FIGS. 1-17, an embodiment of an integral bottle light and shade 10 is illustrated and disclosed.

Figure 1:
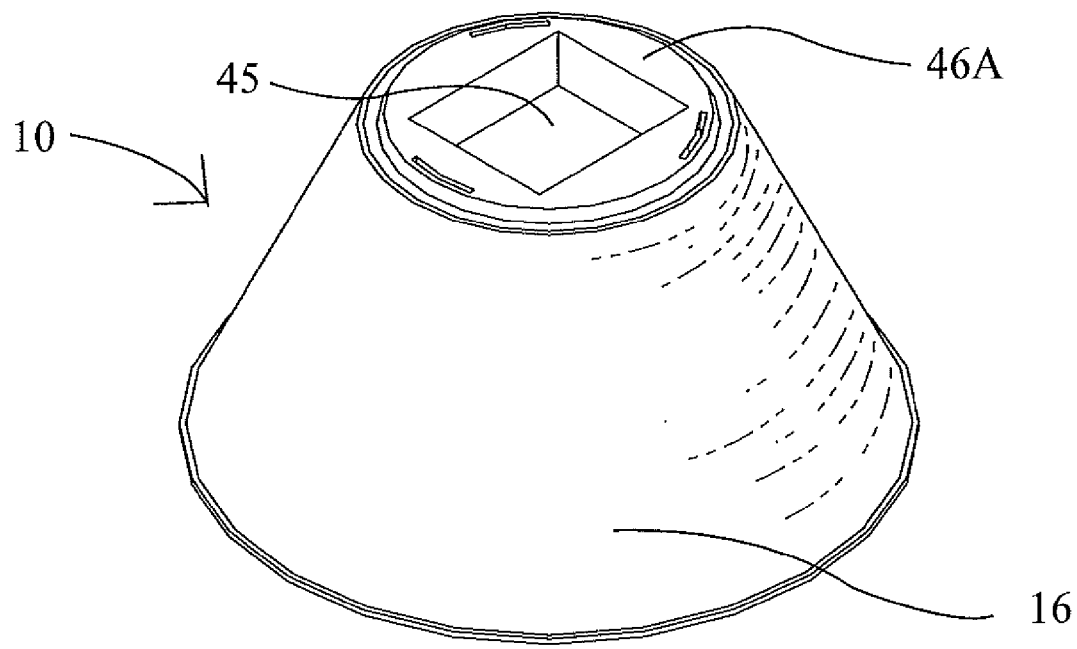
FIG. 1 is a top perspective view of an embodiment of the bottle light and shade 10 having a shade exterior side 16 and flat top circular surface 46A and power supply recess 45.
Figure 2:
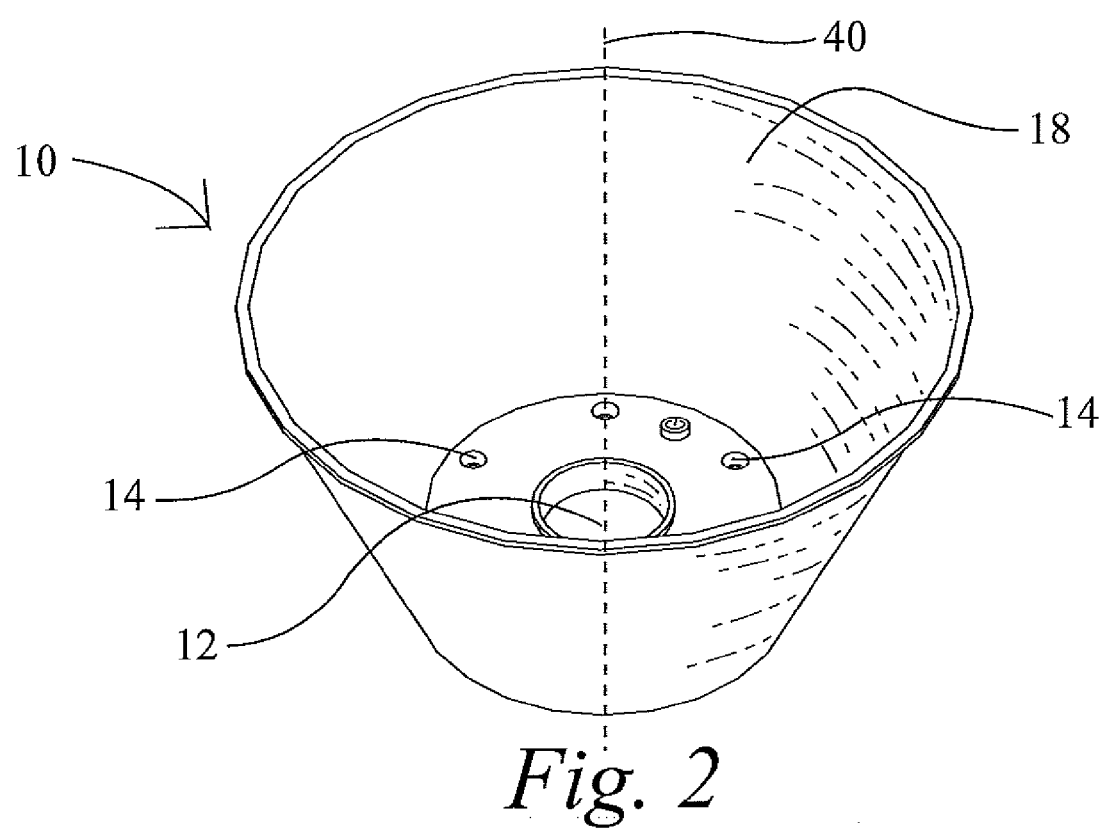
FIG. 2 is a bottom perspective view of an embodiment of the bottle light and shade 10 of FIG. 1 having a shade interior surface 18, a plurality of light bulbs 14 evenly spaced one from the other about a shade central longitudinal axis 40 and embedded in a shade interior planar surface 20 orthogonally disposed to the shade central longitudinal axis 40, and a switch assembly 12.
Figure 9:
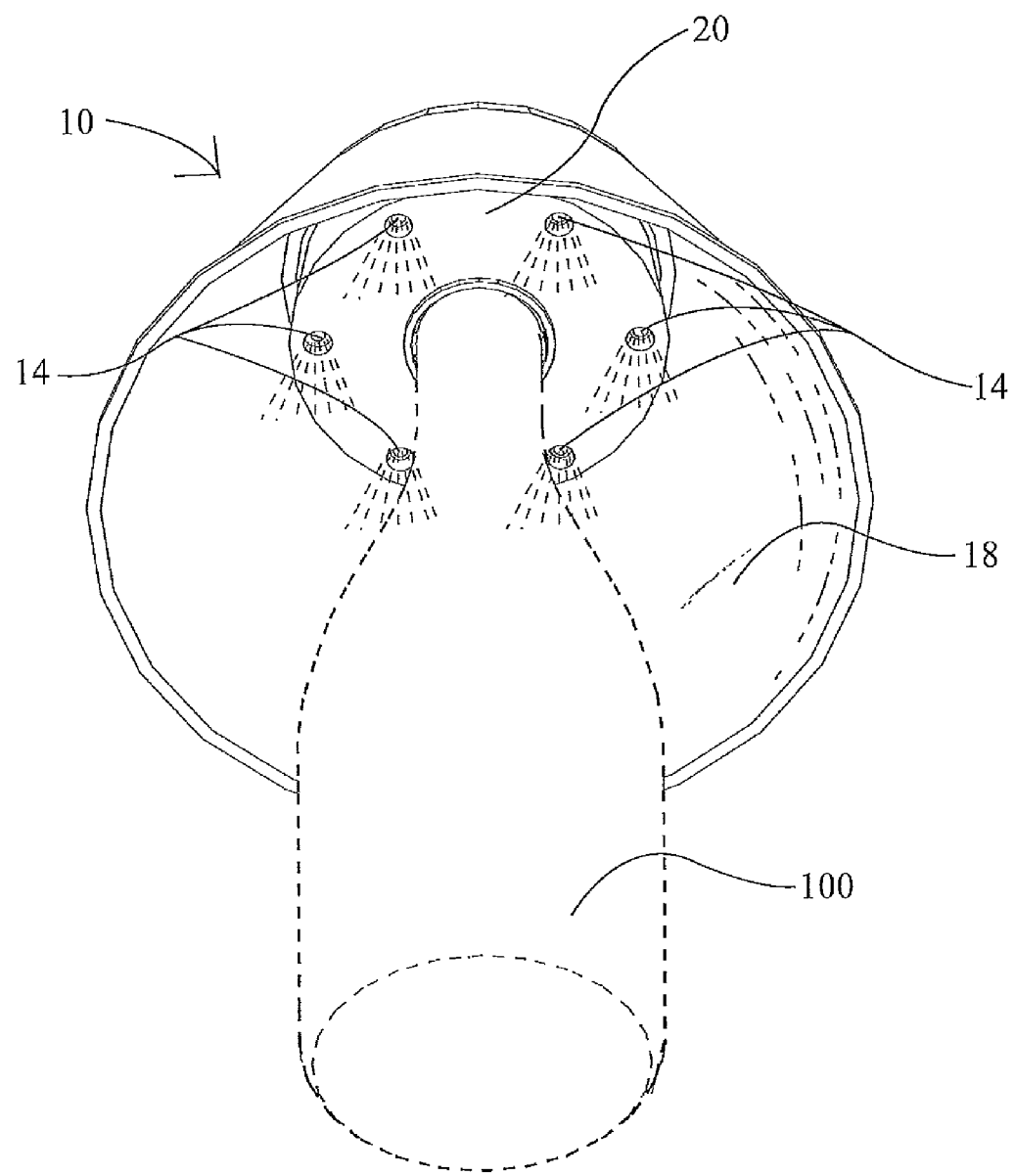
FIG. 9 is a bottom perspective view of the embodiment of the bottle light and shade 10 of FIG. 2, wherein the bottle light and shade 10 is received on the top of a bottle 100 neck, and whereby the bottle neck engages the switch assembly 12 turning on the light bulbs 14.
Figure 10:
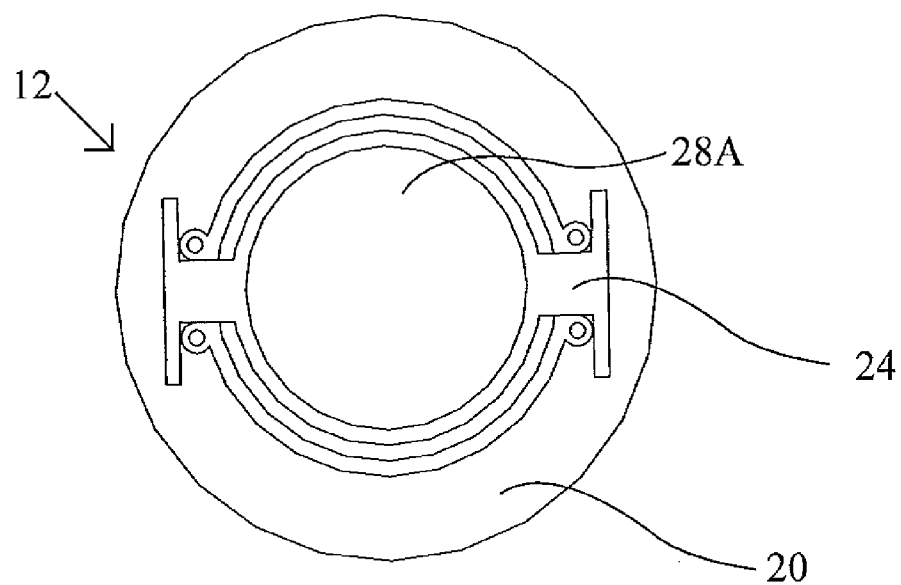
FIG. 10 is a top planar view of the switch assembly 12 of an embodiment of the bottle light and shade 10 of FIG. 2 depicting the movable flange 24 top surface 28A and a portion of the circular, shade interior planar surface 20 surrounding the movable flange 24.
Figure 11:
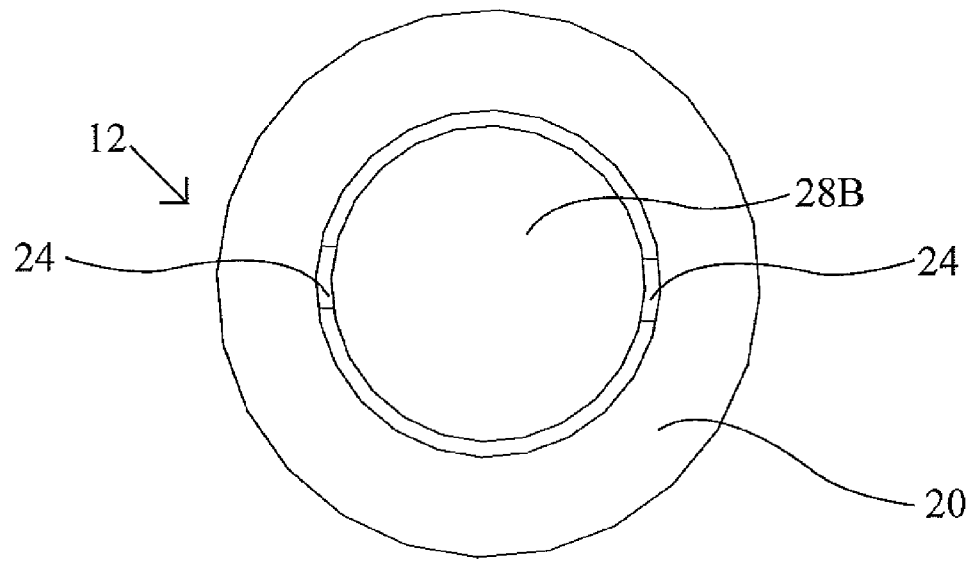
FIG. 11 is a bottom planar view of the switch assembly 12 of an embodiment of the bottle light and shade 10 of FIG. 10 depicting the movable flange 24 bottom surface 28B and a portion of the circular, shade interior planar surface 20 surrounding the movable flange 24.
Figure 12:
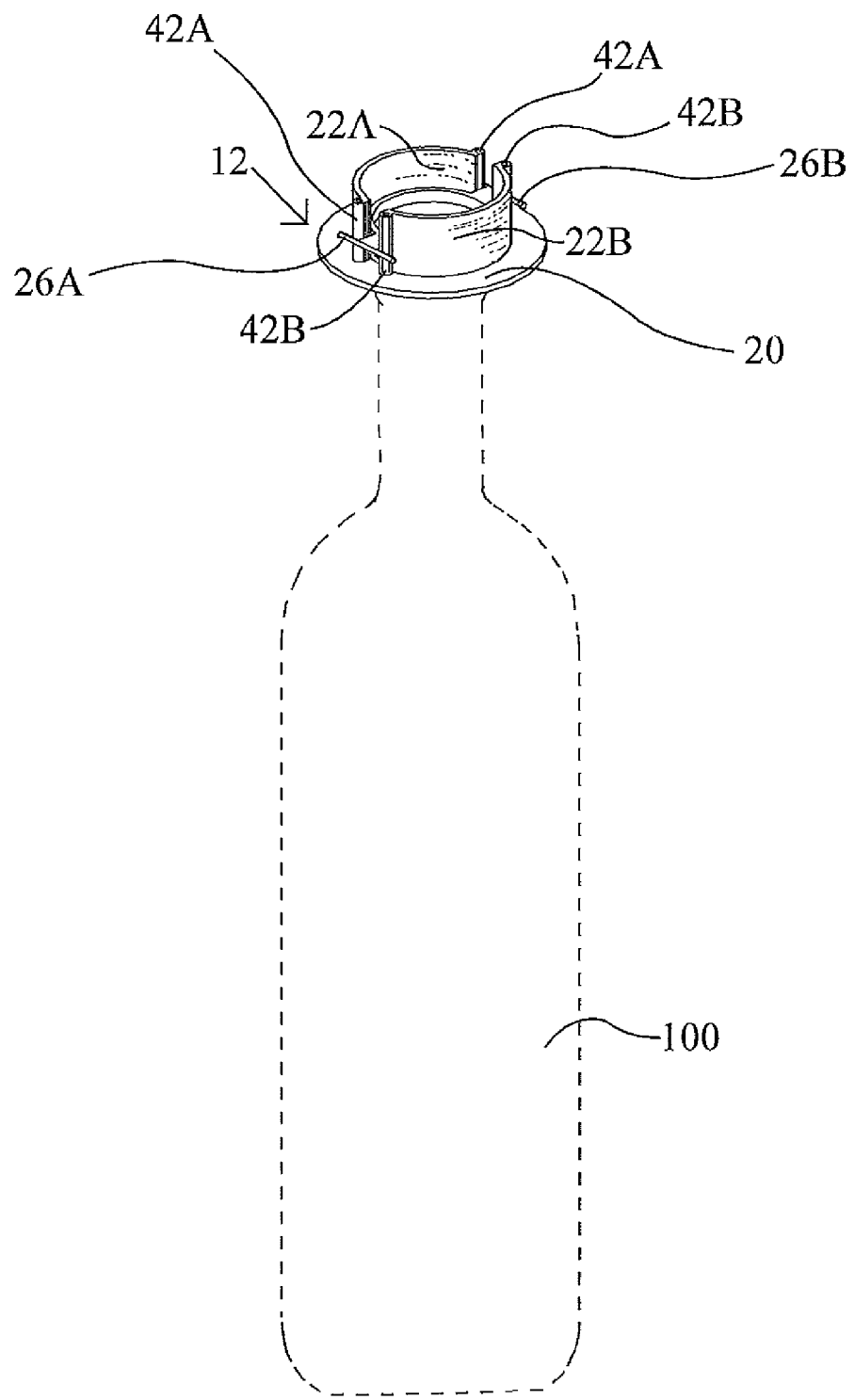
FIG. 12 is a top perspective view of the switch assembly 12 of an embodiment of the bottle light and shade 10 of FIG. 2 fitted onto the neck top surface of the bottle 100 including semi-circular flange guides 22A and 22B each with a dual extension, 26A or 26B respectively, attached to the flange 24 arms through a corresponding equal width gap in each opposite end of the nearly-circular flange guides 22A and 22B so that the flange 24 arms and the dual extensions track along the circular attachment posts, 42A and 42B for any movement of the flange 24.
Figure 13:
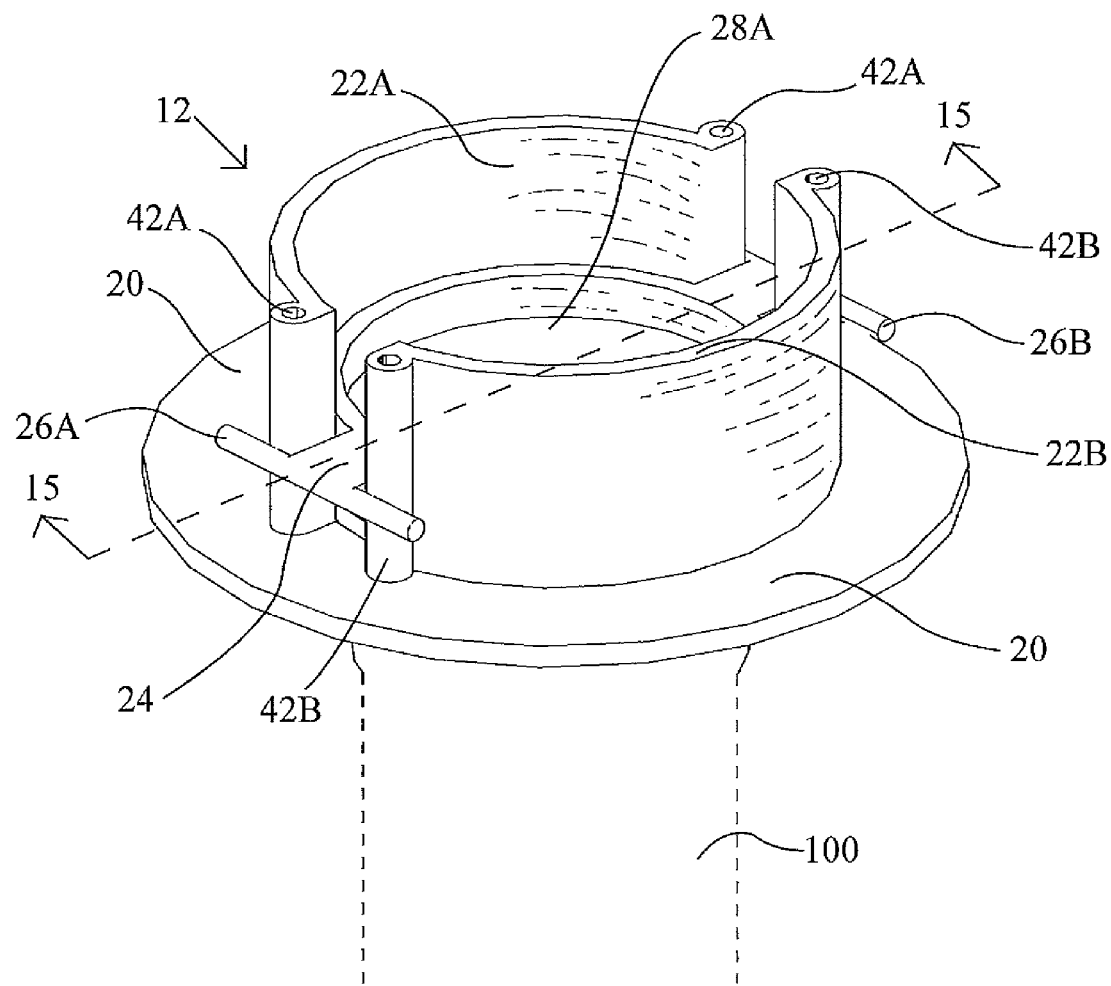
FIG. 13 is a detailed top perspective view of the switch assembly 12 of an embodiment of the bottle light and shade 10 of FIG. 12 fitted onto the neck top surface of the bottle 100.
Figure 14:
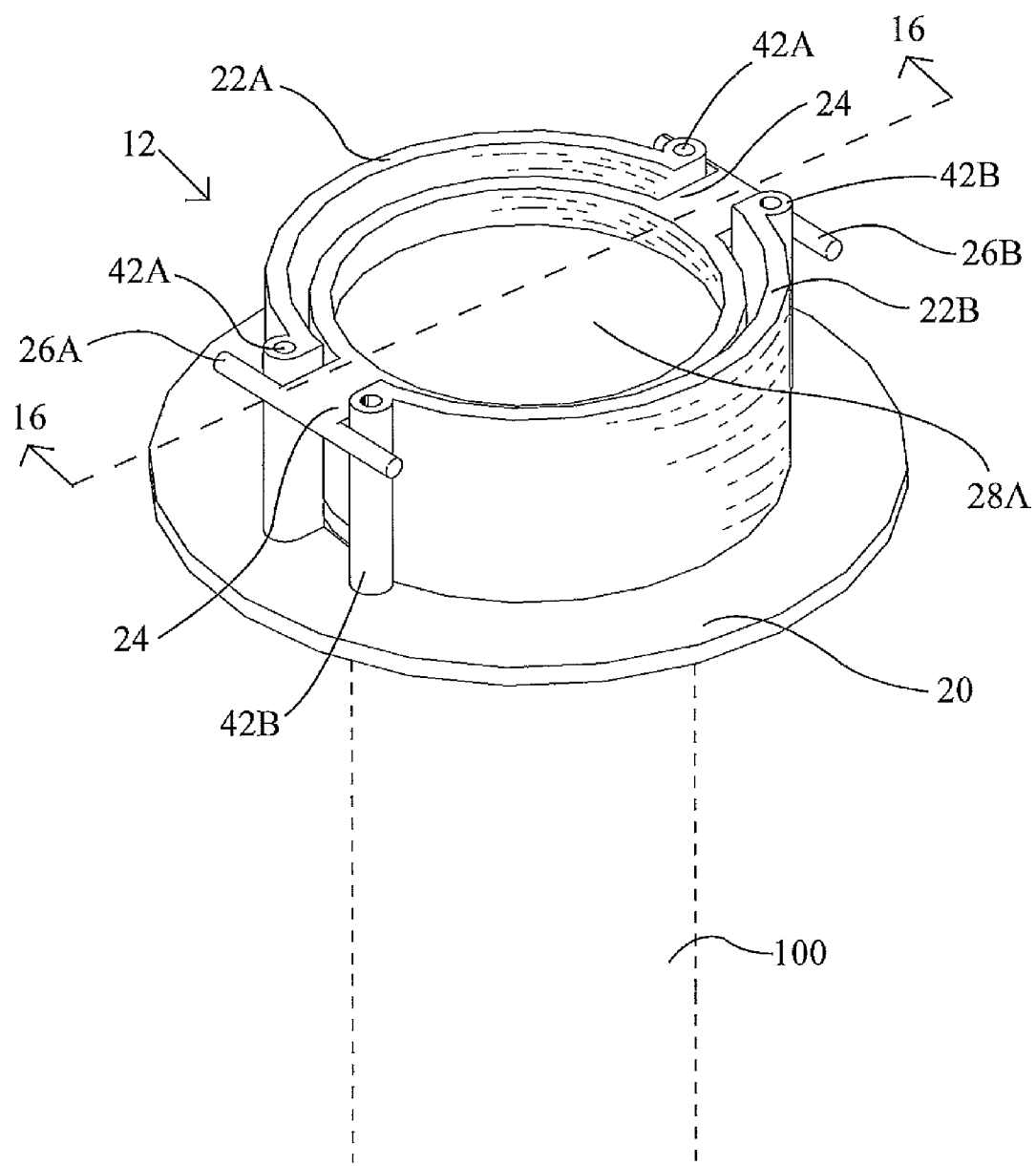
FIG. 14 is a is a detailed top perspective view of the switch assembly 12 of an embodiment of the bottle light and shade 10 of FIG. 13 fitted onto the neck top surface of the bottle 100 wherein the weight of the bottle light and shade 10 against the neck top surface of the bottle 100 displaces the switch assembly surface 28A upwards turning on the light bulbs 14.
Figure 17:
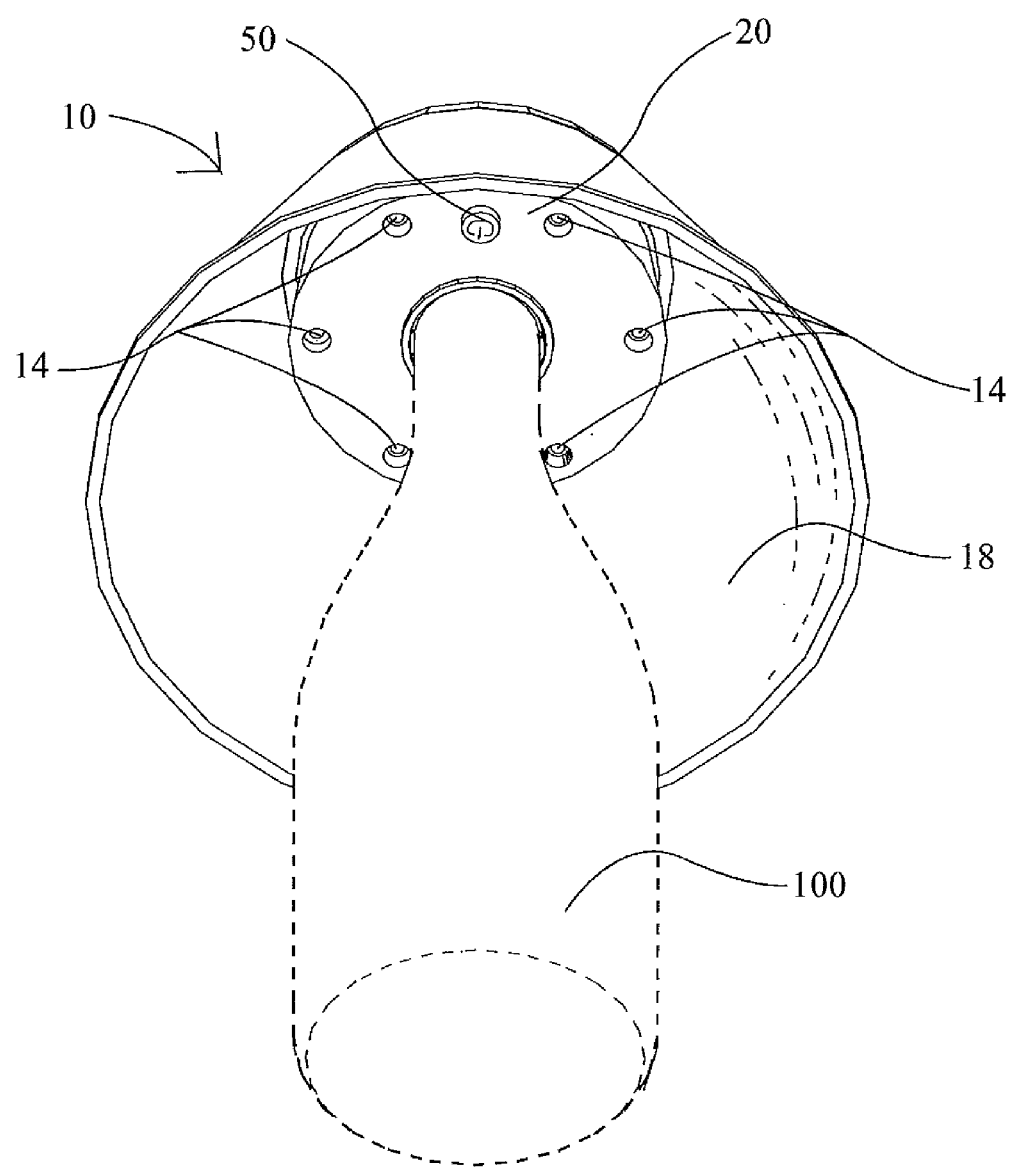
FIG. 17 is a bottom perspective view of the embodiment of the bottle light and shade 10 of FIG. 2, wherein the bottle light and shade 10 is received on the top of a bottle 100 neck, and whereby the bottle neck engages the switch assembly 12 turning on the light bulbs 14, and wherein the bottle light and shade 10 includes a separate manual on/off switch 50 in the shade interior planar surface 20.

An embodiment of an integral bottle light and shade 10 is provided that includes a switched power supply 32 and a plurality of light bulbs 14 configured to provide light directed downward from inside the shade interior surface 18, FIGS. 2 and 9, and 17, once the integral bottle light and shade 10 is positioned upon, and receives the bottle 100 neck top surface into a switch assembly 12, FIGS. 9, 10-16, or when the integral bottle light and shade 10 is positioned upon, and receives the bottle 100 neck top surface into a switch assembly 12, and a manual on/off switch 50 is in the "on" position, FIGS. 10-17.

Thus, an embodiment of an integral bottle light and shade 10 presents a three dimensional lamp shade component comprising a longitudinal axis 40, a flat top circular surface 46A centered on and orthogonally disposed to the longitudinal axis 40, a tapered shade exterior side 16 from a flat top circular surface 46 edge to an open circular shade bottom edge comprising a diameter greater than the flat top circular surface 46A, an circular, shade interior planar surface 20 centered on and orthogonally disposed to the longitudinal axis 40, the circular, shade interior planar surface 20 comprising a diameter greater than the flat top circular surface 46A, but less than the diameter of the open circular shade bottom edge, and an aperture centered on the longitudinal axis 40, and a cap 46B sized to lock into the flat top circular surface 46A, FIGS. 1-2, and 5-8.

An embodiment of an integral bottle light and shade 10 provides a switch assembly 12 housed in a central aperture of the shade interior planar surface 20 that is orthogonally disposed to the shade central longitudinal axis 40. The shade interior planar surface 20 also includes plurality of light bulbs 14 evenly spaced one from the other about the shade central longitudinal axis 40 and embedded in a shade interior planar surface 20 so that when the light bulbs 14 are powered they shine downward from the shade interior surface 18 onto the bottle 100 and the surface area supporting the base of the bottle 100, FIG. 9. An alternative switch assembly for an embodiment of an integral bottle light and shade 10 includes a manual switch 50 to control the flow of power from the switched power supply 32, FIG. 17. In this manner, the integral bottle light and shade 10 positioned on a bottle 100 neck top surface with the lights on by virtue of the switch assembly 12 can remain in place on the bottle 100 neck top surface with the lights manually turned off, and subsequently with the lights manually turned back on using the manual switch 50.

An embodiment of an integral bottle light and shade 10 includes an aspect of the switch assembly 12 that is sized to fit into a central aperture of a circular, shade interior planar surface 20. An aspect of the switch assembly 12 includes two (2) equal sized, nearly semi-circular flange guides 22A and 22B having equal sized radiuses slightly larger than the radius of the central aperture of the circular, shade interior planar surface 20, and circular attachment posts, 42A and 42B, at each flange-guide end, FIGS. 2, 9-17. The semi-circular flange guides 22A and 22B are oppositely affixed to the circular, shade interior planar surface 20 top side by fasteners corresponding to the circular attachment posts, 42A and 42B, such that dual, equal width gaps are provided one hundred eighty degrees one from the other with respect to the central aperture of the circular, shade interior planar surface 20. A movable flange 24 having a top surface 28A, a bottom surface 28B, and dual extensions with orthogonal arms, 26A and 26B, is sized to positionally fit within the semi-circular flange guides 22A and 22B with each dual extension, 26A or 26B, extending through a corresponding equal width gap in each opposite end of the nearly-circular flange guides 22A and 22B so that the orthogonal arms and the dual extensions track along the circular attachment posts, 42A and 42B for any movement of the flange 24.

Figure 3:
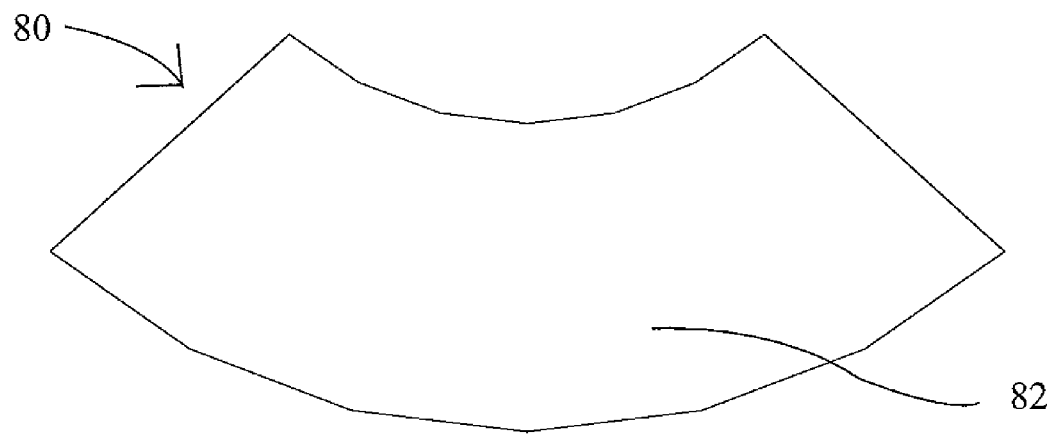
FIG. 3 is a top planar view of a semi-rigid shade cover 80 having a folded, flat surface 82.

As the integral bottle light and shade 10 is positioned over the top neck surface of bottle 100 along a shade central longitudinal axis 40, FIG. 3. When the integral bottle light and shade 10 is released to rest on the top neck surface of bottle 100, the weight of the integral bottle light and shade 10 assembly receiving the bottle 100 neck top surface forces the bottle 100 neck top surface into the switch assembly 12, closing a hinged movable switch 34. At that time, power from the switched power supply 32 lights the light bulbs 14 as long as the integral bottle light and shade 10 assembly receives the bottle 100 neck top surface. The light bulbs 14 are then switched on, see, e.g. FIGS. 9 and 16, or for an embodiment of the integral bottle light and shade 10 including a manual on/off switch 50, FIGS. 16 and 17, when the manual on/off switch 50 also is on the "on" position.

Figure 15:
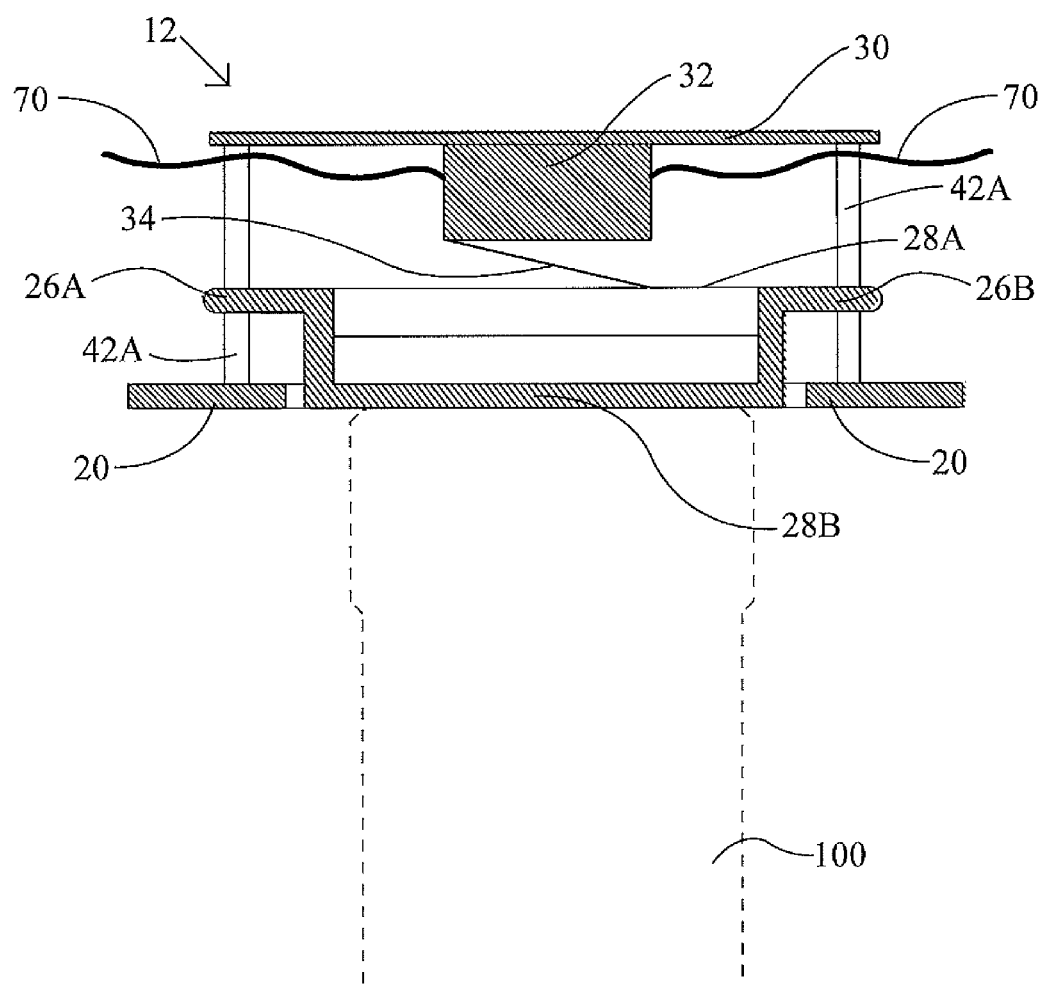
FIG. 15 is a detailed cross sectional view of the switch assembly 12 of an embodiment of the bottle light and shade 10 of FIG. 13 taken at "15-15" and further including the switched power supply 32, the hinged, movable power switch 34, the switched power supply cover 30, and wiring circuitry 70 between the switched power supply 32 and light bulbs 14 for the embodiment of the bottle light and shade 10.
Figure 16:
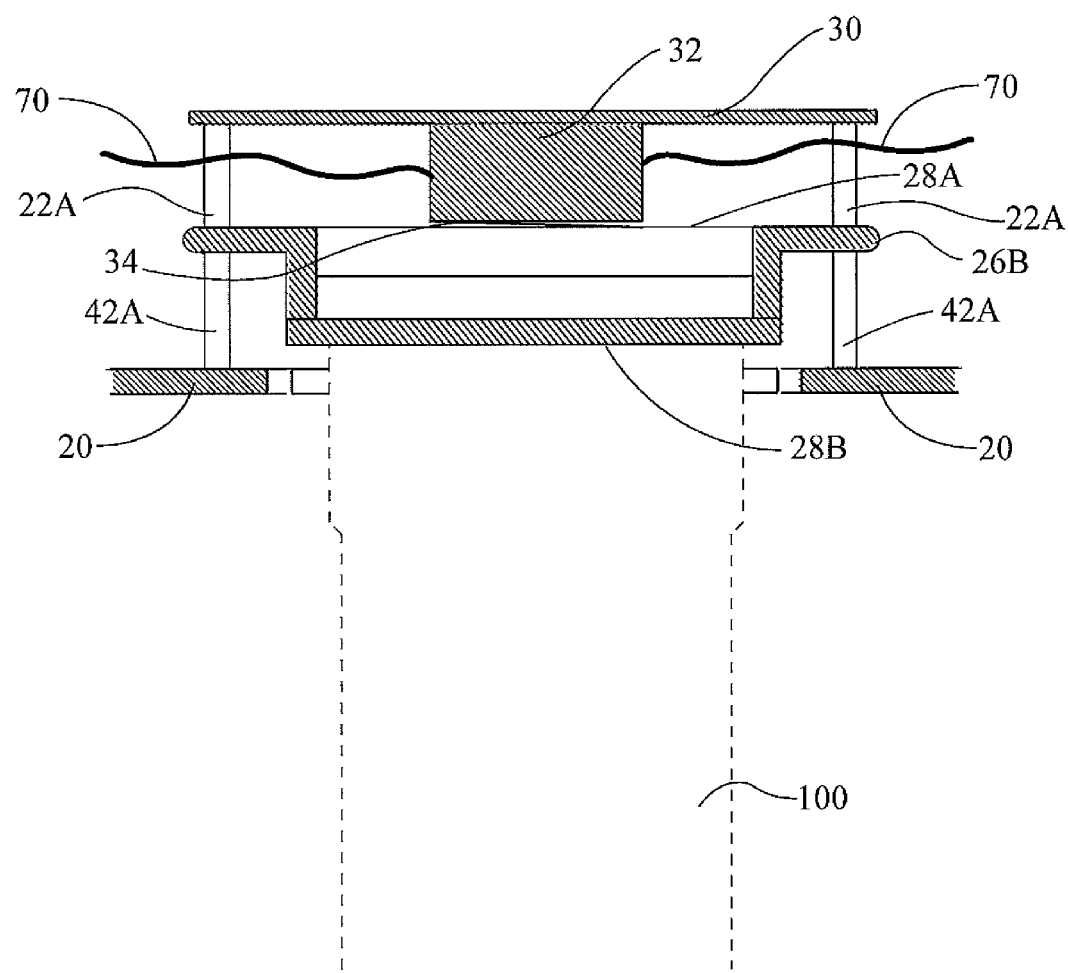
FIG. 16 is a detailed cross sectional view of the switch assembly 12 of an embodiment of the bottle light and shade 10 of FIG. 14 taken at "16-16" and further including the switched power supply 32, the hinged, movable power switch 34, the switched power supply cover 30, and wiring circuitry 70 between the switched power supply 32 and light bulbs 14 for the embodiment of the bottle light and shade 10.

Lifting the integral bottle light and shade 10 assembly off the bottle 100 neck top surface causes the hinged movable switch 34 of the switch assembly 12 to drop into the aperture opening the power circuit and cutting the power to the light bulbs 14, FIG. 15. It will be understood that for the embodiment of bottle light and shade 10 that also includes a manual on/off switch 50, FIG. 17, the power to the lights 14 can be interrupted while the switch assembly 12 of the bottle light and shade 10 is still engaged with bottle 100 neck top surface by switching the manual on/off switch 50 to the "off" position.

An embodiment of the integral bottle light and shade 10 assembly includes a switched power supply 32 having a plurality of AAA 1.5 W Ultra Digital Alkaline batteries, or the like, which are accessible through the switched power supply cover 30 within the flat top circular surface 46.

An embodiment of the integral bottle light and shade 10 assembly includes a switched power supply 32 that includes rechargeable batteries.

An embodiment of the integral bottle light and shade 10 assembly includes six (6) light bulbs 14 evenly spaced one from the other about the shade central longitudinal axis 40 and embedded in a shade interior planar surface 20 such that when the light bulbs 14 are turned by the weight of the bottle light and shade 10 against the neck top surface of the bottle 100 acting to displace the switch assembly surface 28A upwards and closing the hinged movable switch 34. As power from switched power supply 32 lights the light bulbs 14, the resulting light is directed downward from the shade interior surface 18 onto the bottle 100 and the surface area supporting the base of the bottle 100, see, e.g. FIG. 9. Electrical circuitry wiring 70 between the switched power supply 32 and the light bulbs 14 is housed in the space between circular, shade interior planar surface 20 and the flat top circular surface 46, FIGS. 15 and 16.

With exception to the electrical circuitry wiring 70, switched power supply 32 and the light bulbs 14, an embodiment of the integral bottle light and shade 10 assembly is manufactured from high impact, recycled plastic materials.

A preferred embodiment of bottle light and shade 10 provides light emitting diode (LED) lamps as the light bulbs 14.

Figure 4:
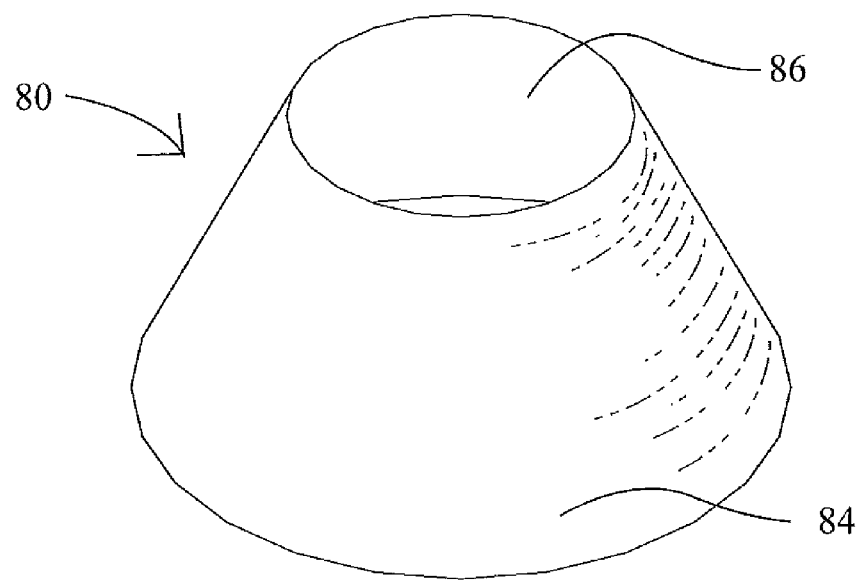
FIG. 4 is a top perspective view of (i) the semi rigid shade cover 80 of FIG. 3 with the shade cover 80 opened to provide a cone having an inside surface 86 and an outside surface 84, or (ii) a rigid shade cover 80 cone having an inside surface 86 and an outside surface 84, where both shade covers 80 are sized to fit over the shade exterior side 16 of FIG. 1.
Figure 5:
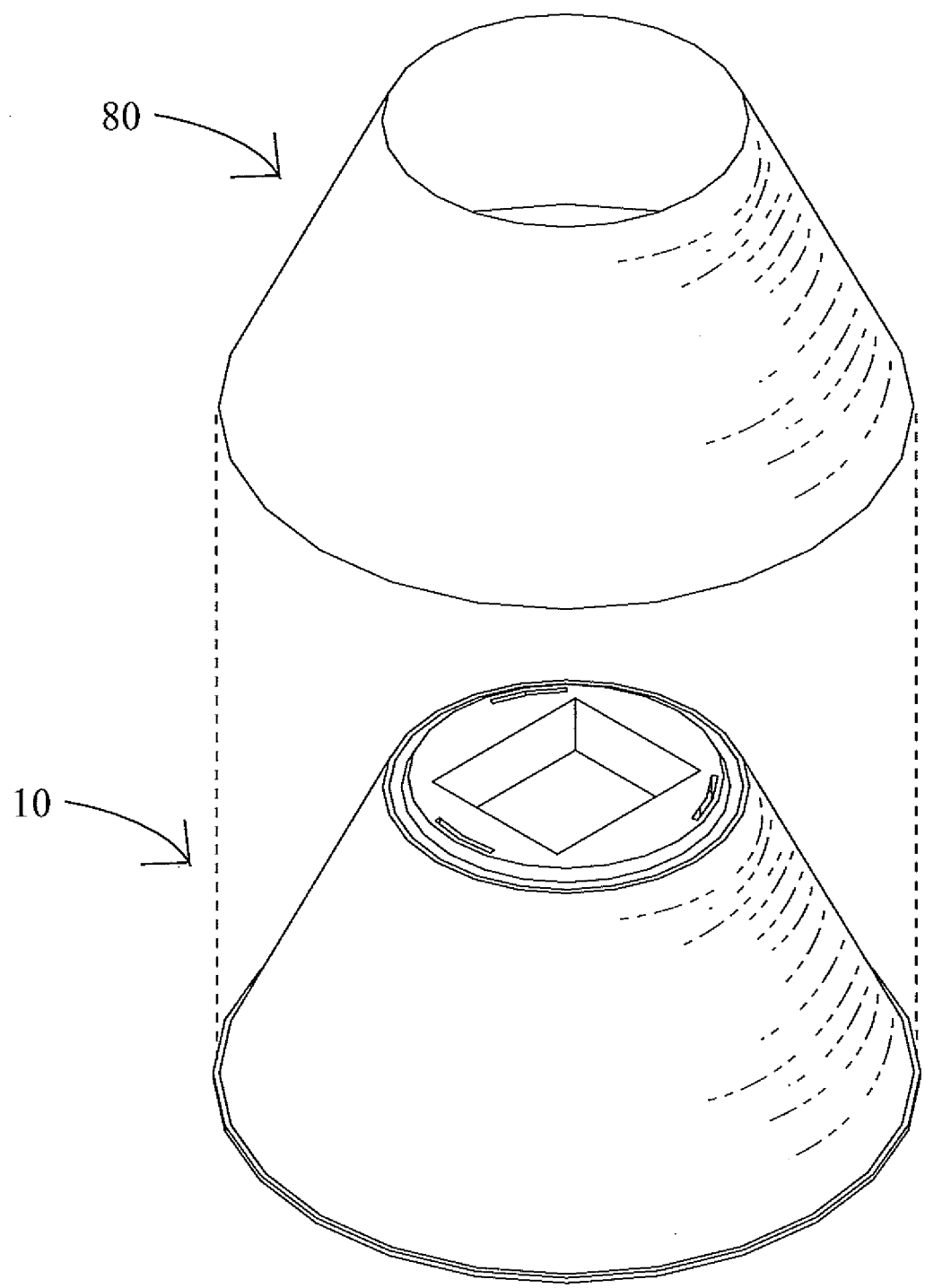
FIG. 5 is a top perspective view of at least one shade cover 80 cone of FIG. 4 fitting over the shade exterior side 16 of the bottle light and shade 10 of FIG. 1.
Figure 6:
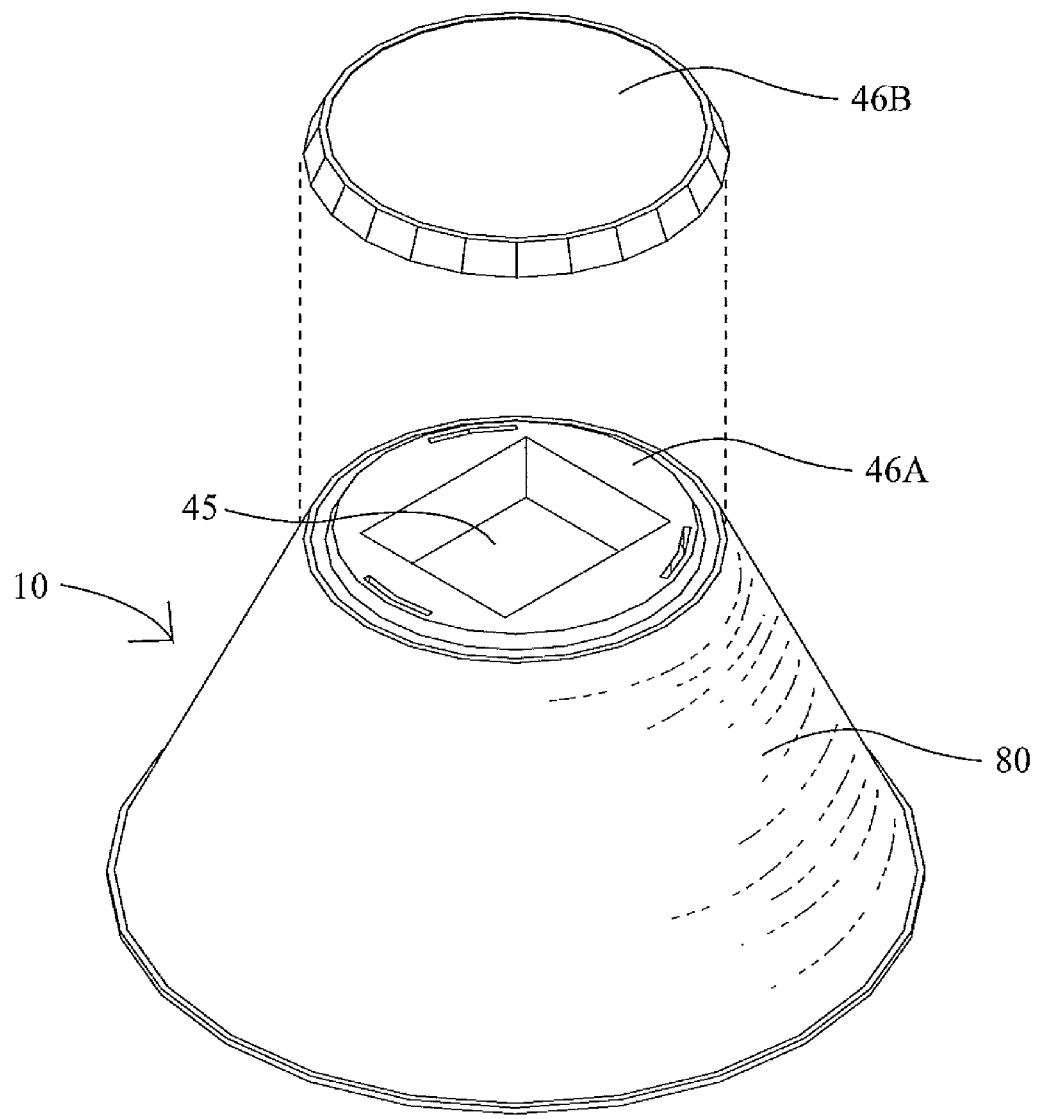
FIG. 6 is a top perspective view of the shade cover 80 cone of FIG. 5 received over the shade exterior side 16 of the bottle light and shade 10 of FIG. 1 and locked into place by the cap 46B.
Figure 7:
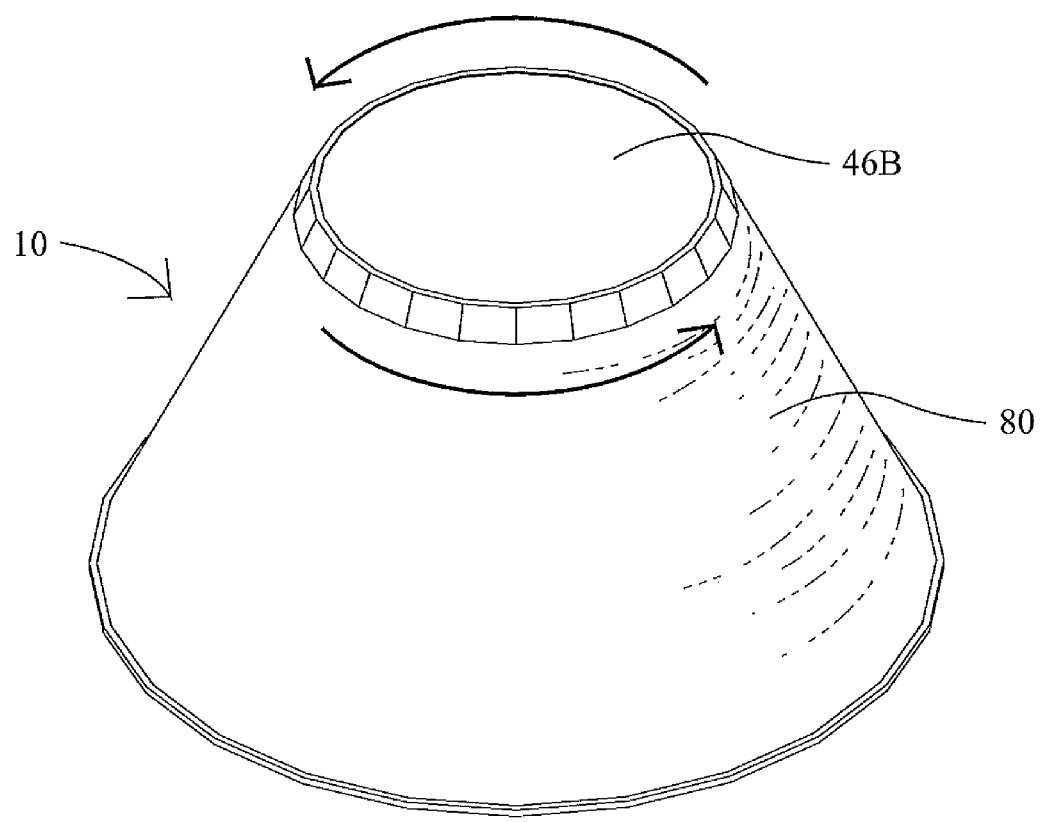
FIG. 7 is a top perspective view of the bottle light and shade 10 of FIG. 6 depicting the cap 46B locking into the flat top circular surface 46A of FIG. 1.
Figure 8:
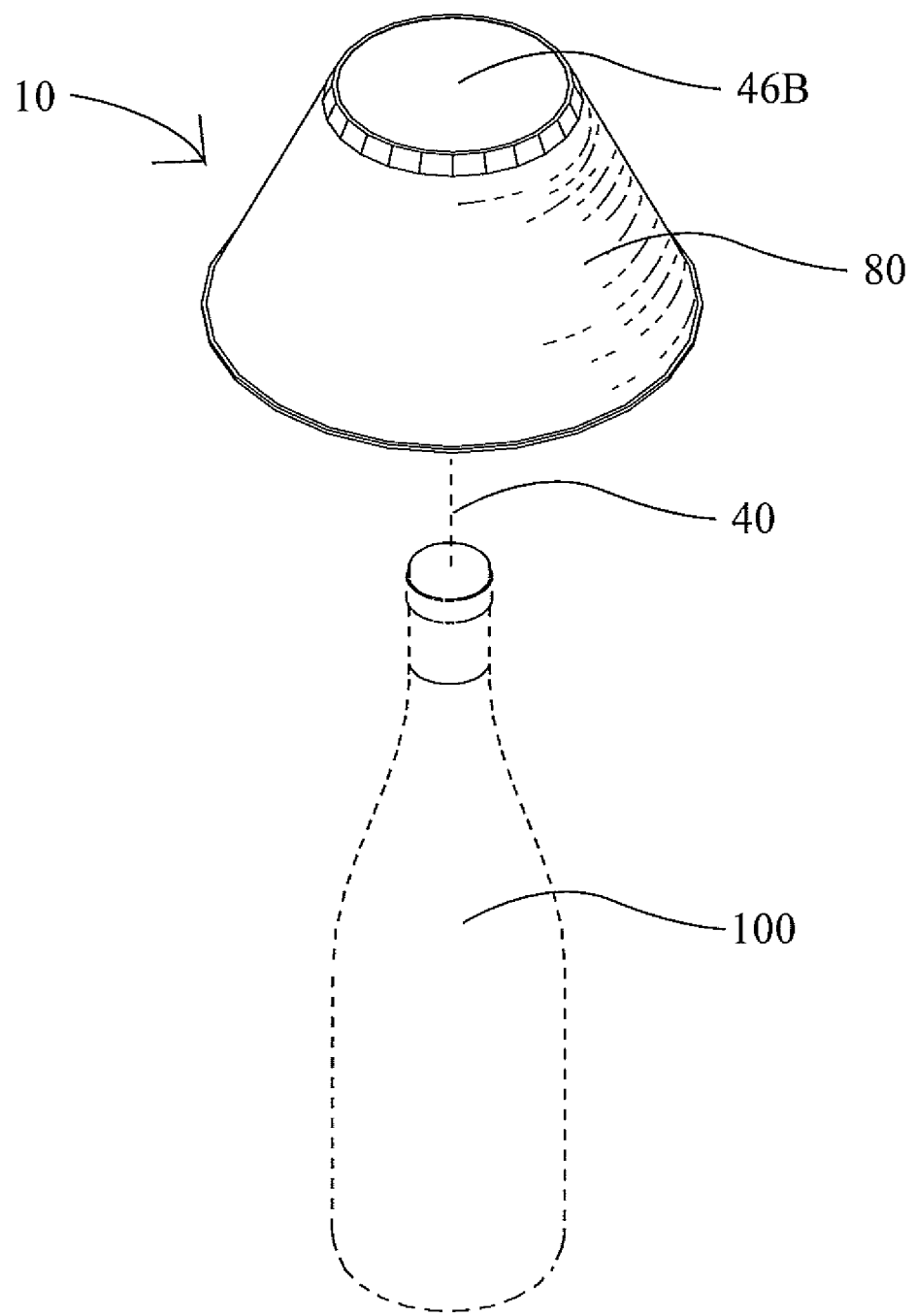
FIG. 8 is a top perspective view of an embodiment of the bottle light and shade 10 of FIG. 7 aligned along the shade central longitudinal axis 40 to be placed upon the top of a bottle 100 neck.

Embodiments of the bottle light and shade 10 include shade covers 80 that can be either rigid or semi-rigid 82, FIGS. 3-4. These rigid or semi-rigid shade covers 80, FIGS. 4 and 3 respectively, are conical and sized to fit over the tapered shade exterior side 16 from a flat top circular surface 46A edge to the open circular shade bottom edge, FIGS. 5-7. These rigid or semi-rigid shade covers, FIGS. 4 and 3 respectively, have an interior surface 86 and an exterior surface 84, and can include solid colors, colored patterns or images, logos, brands, trademarked images or marks, or other desired media as desired by the end user and/or the use environment. The shade cover is locked into place over the bottle light and shade 10 by the cap 46B locking into the flat top circular surface 46A, FIG. 7.

Thus, particular embodiments of the bottle light and shade 10 relate to an integral light and shade assembly which is attachable to the body of a standard bottle neck to form a table lamp to provide a useful light source and/or display element, while still satisfying the complement of requirements presented by dimensions, use and design preferences. Furthermore, the bottle light and shade 10 disclosed and claimed herein has been fashioned in such a manner as to maximize its utility over a broad range of applications, while minimizing the labor, parts and tools required for implementation. Since the apparatus is characterized by its universality and its relative simplicity and ease of installation, it serves to fulfill both lighting and display applications. The adjustability feature of the apparatus over a wide range of top surfaces of bottle neck tops means that less "design customizing" is required for any given display or installation, thus leading to demonstrable cost savings.

We claim:

1. An integral light and shade assembly comprising, in combination:
   a) a three dimensional lamp shade component comprising a longitudinal axis, a flat top circular surface centered on and orthogonally disposed to the longitudinal axis and comprising a power supply recess, tapered sides from a flat top circular surface edge to an open circular shade bottom edge comprising a diameter greater than the flat top circular surface, a circular, shade interior planar surface centered on and orthogonally disposed to the longitudinal axis, the circular, shade interior planar surface comprising a diameter greater than the flat top circular surface, but less than the diameter of the open circular shade bottom edge, a shade interior planar surface aperture centered on the longitudinal axis, and a cap sized to be received by and cover the flat top circular surface;
   b) a plurality of light bulbs within the circular, shade interior planar surface and equally spaced about the longitudinal axis such that each light bulb is oriented to shine light downwards out the open circular shade bottom;
   c) a switched power supply housed in the power supply recess between the flat top circular surface and the circular, shade interior planar surface;
   d) wiring housed in a space between the flat top circular surface and the circular, shade interior planar surface and connecting the power supply to the plurality of light bulbs; and
   e) means for switching on the power supply only once the lamp shade is positioned upon a rigid vertical member aligned with the longitudinal axis and sized to be received within the circular, shade interior planar surface aperture; wherein the rigid member is a neck portion of a bottle.

2. The integral light and shade assembly of claim 1, wherein means for switching on the power supply once the lamp shade is positioned upon the rigid vertical member aligned with the longitudinal axis and sized to be received within the circular, shade interior planar surface aperture comprises, in combination,
   a) two equal sized, nearly semi-circular flange guides comprising equal sized radiuses slightly larger than a radius of a central aperture of the circular, shade interior planar surface;
   b) circular attachment posts at an end of each flange-guide;
   c) fasteners corresponding to the circular attachment posts thereby affixing the semi-circular flange guides to the circular attachment posts such that the semi-circular flange guides are oppositely affixed to a circular, shade interior planar surface top side and such that dual, equal width gaps are provided one hundred eighty degrees one from the other with respect to the central aperture of the circular, shade interior planar surface top side; and
   d) a movable flange comprising a top surface, a bottom surface, and dual extensions with arms orthogonally disposed to an end of each dual extension, and sized to positionally fit within the semi-circular flange guides such that with each dual extension extending through a corresponding equal width gap in each opposite end of the nearly-circular flange guides, and that the arms orthogonally disposed to the end of each dual extension and the dual extensions track along the circular attachment posts for any movement of the flange;
   whereby when the integral light and shade is released to rest on the rigid vertical member aligned with the longitudinal axis and sized to be received within the circular, shade interior planar surface aperture, the weight of the integral light and shade assembly receiving the rigid vertical member forces a rigid vertical member top surface into the circular, shade interior planar surface aperture and in contact with the movable flange closing the power circuit from the power supply to the light emitting diode lamps and lighting the light emitting diode lamps as long as the rigid vertical member top surface contacts the movable flange.

3. The integral light and shade assembly of claim 2, further comprising a separate manual on/off power switch.

4. The integral light and shade assembly of claim 1, wherein the switched power supply comprises batteries.

5. The integral light and shade assembly of claim 1, wherein the switched power supply comprises rechargeable batteries.

6. The integral light and shade assembly of claim 1, wherein the light bulbs comprise light emitting diode lamps.

7. The integral light and shade assembly of claim 1, further comprising at least one conical shade cover sized to fit over the tapered shade exterior side from the flat top circular surface edge to the open circular shade bottom edge.

8. An integral light and shade assembly comprising, in combination:
   a) a three dimensional lamp shade component comprising a longitudinal axis, a flat top circular surface centered on and orthogonally disposed to the longitudinal axis and comprising a power supply recess, tapered sides from a flat top circular surface edge to an open circular shade bottom edge comprising a diameter greater than the flat top circular surface, a circular, shade interior planar surface centered on and orthogonally disposed to the longitudinal axis, the circular, shade interior planar surface comprising a diameter greater than the flat top circular surface, but less than the diameter of the open circular shade bottom edge, a shade interior planar surface aperture centered on the longitudinal axis, and a cap sized to be received by and cover the flat top circular surface;
   b) a plurality of light bulbs within the circular, shade interior planar surface and equally spaced about the longitudinal axis such that each light emitting diode lamp is oriented to shine light downwards out the open circular shade bottom;
   c) a switched power supply housed in power supply recess between the flat top circular surface and the circular, shade interior planar surface;
   d) wiring housed in a space between the flat top circular surface and the circular, shade interior planar surface and connecting the power supply to the plurality of light bulbs; and e) two equal sized, nearly semi-circular flange guides comprising equal sized radiuses slightly larger than a radius of a central aperture of the circular, shade interior planar surface;
f) circular attachment posts at an end of each flange-guide;
g) fasteners corresponding to the circular attachment posts thereby affixing the semi-circular flange guides to the circular attachment posts such that the semi-circular flange guides are oppositely affixed to a circular, shade interior planar surface top side and such that dual, equal width gaps are provided one hundred eighty degrees one from the other with respect to a central aperture of the circular, shade interior planar surface top side; and
h) a movable flange comprising a top surface, a bottom surface, and dual extensions with arms orthogonally disposed to as an end of each dual extension, and sized to positionally fit within the semi-circular flange guides such that with each dual extension extending through a corresponding equal width gap in each opposite end of the nearly-circular flange guides, and that the arms orthogonally disposed to the end of each dual extension and the dual extensions track along the circular attachment posts for any movement of the flange;

whereby when the integral light and shade is released to rest on the rigid vertical member aligned with the longitudinal axis and sized to be received within the circular, shade interior planar surface aperture, the weight of the integral light and shade assembly receiving the rigid vertical member forces a rigid member surface into the aperture and in contact with the movable flange closing the power circuit from the power supply to the light bulbs and lighting the light bulbs as long as the rigid vertical member top surface contacts the movable wherein the rigid member is a neck portion of a bottle.

9. The integral light and shade assembly of claim 8, wherein the switched power supply comprises batteries.

10. The integral light and shade assembly of claim 8, wherein the switched power supply comprises rechargeable batteries.

11. The integral light and shade assembly of claim 8, wherein the light bulbs comprise light emitting diode lamps.

12. An integral light and shade assembly comprising, in combination:
a) a three dimensional lamp shade component comprising a longitudinal axis, a flat top circular surface centered on and orthogonally disposed to the longitudinal axis and comprising a power supply recess, tapered sides from a flat top geometric surface edge to an open geometric, shade bottom edge comprising a cross-sectional area greater than the flat top geometric surface, a geometric, shade interior planar surface centered on and orthogonally disposed to the longitudinal axis, the geometric, shade interior planar surface comprising a cross-sectional area greater than the flat top geometric surface, but less than the cross-sectional area of the open geometric shade bottom edge, a shade interior planar surface aperture centered on the longitudinal axis, and a cap sized to be received by and cover the flat top circular surface;
b) a plurality of light emitting diode lamps within the geometric, shade interior planar surface and equally spaced about the longitudinal axis such that each light emitting diode lamp is oriented to shine light downwards out the open geometric, shade bottom edge;
c) a switched power supply housed in the power supply recess between the flat top geometric surface and the geometric, shade interior planar surface;
d) wiring housed in a space between the flat top geometric surface and the geometric, shade interior planar surface and connecting the power supply to the plurality of light emitting diode lamps; and
e) two equal sized, nearly semi-circular flange guides comprising equal sized radiuses slightly larger than a radius of a central aperture of the geometric, shade interior planar surface;
f) circular attachment posts at an end of each flange-guide;
g) fasteners corresponding to the circular attachment posts thereby affixing the semi-circular flange guides to the circular attachment posts such that the semi-circular flange guides are oppositely affixed to a geometric, shade interior planar surface top side and such that dual, equal width gaps are provided one hundred eighty degrees one from the other with respect to the central aperture of the geometric, shade interior planar surface top side; and
h) a movable flange comprising a top surface, a bottom surface, and dual extensions with arms orthogonally disposed to an end of each dual extension, and sized to positionally fit within the semi-circular flange guides such that with each dual extension extending through a corresponding equal width gap in each opposite end of nearly-circular flange guides, and that the arms orthogonally disposed to the end of each dual extension and the dual extensions track along the circular attachment posts for any movement of the flange;

whereby when the integral light and shade is released to rest on the rigid vertical member aligned with the longitudinal axis and sized to be received within the geometric, shade interior planar surface aperture, the weight of the integral light and shade assembly receiving the rigid vertical member forces a rigid member top surface into the geometric, shade interior planar surface aperture and in contact with the movable flange closing the power circuit from the power supply to the light emitting diode lamps and lighting the light emitting diode lamps as long as the rigid vertical member top surface contacts the movable flange wherein the rigid member is a neck portion of a bottle.

13. The integral light and shade assembly of claim 12, wherein the switched power supply comprises batteries.

14. The integral light and shade assembly of claim 12, wherein the switched power supply comprises rechargeable batteries.

15. The integral light and shade assembly of claim 12, wherein all geometric surfaces are circular.

16. The integral light and shade assembly of claim 15, further comprising at least one conical shade cover sized to fit over the tapered shade exterior side from the flat top circular surface edge to the open circular shade bottom edge.

17. An integral light and shade assembly comprising, in combination:
a) a three dimensional lamp shade component comprising a longitudinal axis, a flat top circular surface centered on and orthogonally disposed to the longitudinal axis and comprising a power supply recess, tapered sides from a flat top circular surface edge to an open circular shade bottom edge comprising a diameter greater than the flat top circular surface, a circular, shade interior planar surface centered on and orthogonally disposed to the longitudinal axis, the circular, shade interior planar surface comprising a diameter greater than the flat top circular surface, but less than the diameter of the open circular shade bottom edge, a shade interior planar surface aperture centered on the longitudinal axis, and a cap sized to be received by and cover the flat top circular surface;

b) a plurality of light emitting diode lamps within the circular, shade interior planar surface and equally spaced about the longitudinal axis such that each light emitting diode lamp is oriented to shine light downwards out the open circular shade bottom;

c) a switched power supply housed in a space between the flat top circular surface and the circular, shade interior planar surface;

d) a separate manual on/off power switch;

e) wiring housed in the space between the flat top circular surface and the circular, shade interior planar surface and connecting the power supply to the plurality of light emitting diode lamps; and f) two equal sized, nearly semi-circular flange guides comprising equal sized radiuses slightly larger than a radius of a central aperture of the circular, shade interior planar surface;

g) circular attachment posts at an end of each flange-guide;

h) fasteners corresponding to the circular attachment posts thereby affixing the semi-circular flange guides to the circular attachment posts such that the semi-circular flange guides are oppositely affixed to a circular, shade interior planar surface top side and such that dual, equal width gaps are provided one hundred eighty degrees one from the other with respect to the central aperture of the circular, shade interior planar surface;

i) a movable flange comprising a top surface, a bottom surface, and dual extensions with arms orthogonally disposed to and end of each dual extension, and sized to positionally fit within the semi-circular flange guides such that each dual extension extends through a corresponding equal width gap in each opposite end of the nearly-circular flange guides, and that the arms orthogonally disposed to the end of each dual extension and the dual extensions track along the circular attachment posts for any movement of the flange; and j) at least one conical shade cover sized to fit over the tapered shade exterior side from the flat top circular surface edge to the open circular shade bottom edge;

whereby when the integral light and shade is released to rest on a bottle neck top surface aligned with the longitudinal axis and sized to be received within the circular, shade interior planar surface aperture, the weight of the integral light and shade assembly receiving the bottle neck top surface forces the bottle neck top surface into the circular, shade interior planar surface aperture and in contact with the movable flange closing the power circuit from the power supply to the light emitting diode lamps and lighting the light emitting diode lamps as long as the bottle neck top surface contacts the movable flange and the separate manual on/off power switch is in an "on" position.

* * * * *